Figures 1, 2, 3:
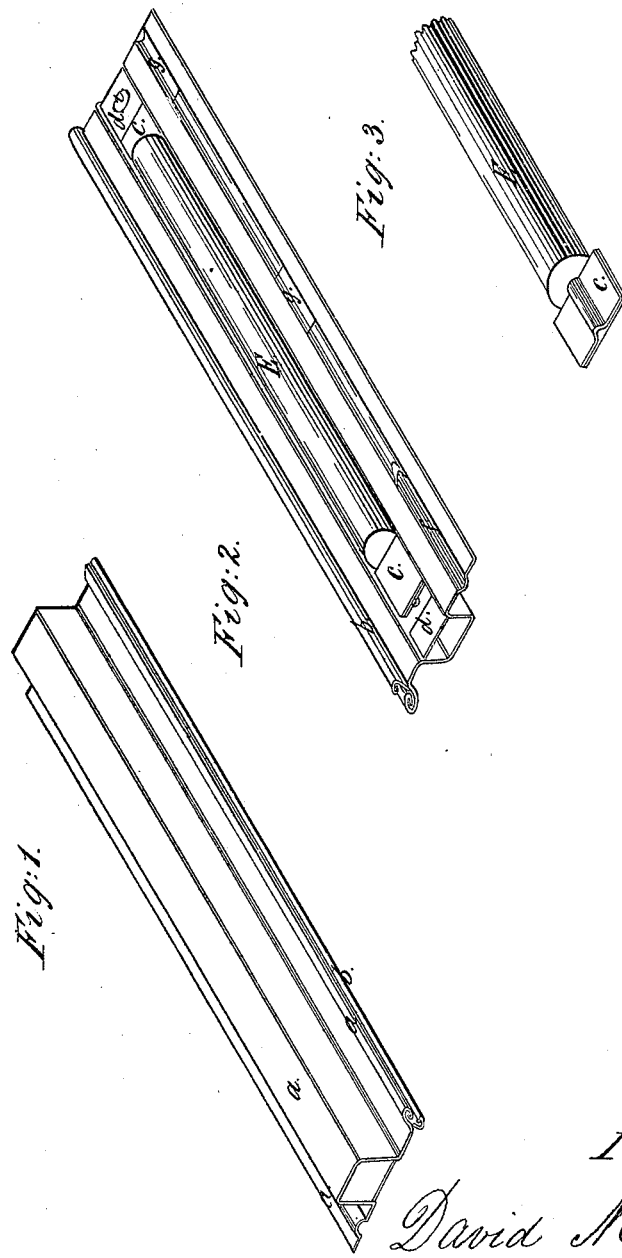

D. Munson.
Ruler.

Nº 51,609. Patented Dec. 19, 1865.

Witnesses.
A. F. Mayhew
A. G. Porter

Inventor.
David Munson.

UNITED STATES PATENT OFFICE.

DAVID MUNSON, OF INDIANAPOLIS, INDIANA.

IMPROVEMENT IN METALLIC RULERS.

Specification forming part of Letters Patent No. 51,609, dated December 19, 1865.

*To all whom it may concern:*

Be it known that I, DAVID MUNSON, of Indianapolis, county of Marion, and State of Indiana, have invented certain Improvements in Combined Rulers and Paper-Cutters; and I do hereby declare that the following is a full, clear, and exact description thereof, reference being had to the acccompanying drawings, making part of the same, in which—

Figure 1 is a perspective view of the combined ruler and paper-cutter. Fig. 2 is a perspective view of the same inverted to show the improvements more clearly. Fig. 3 shows one end of the ruler and one of the stays, $c$, on which the bearing of the roller is fixed.

The nature of my invention consists in certain improvements in the combined adjustable ruler and paper-cutter for which Letters Patent were granted to me on the 22d day of March, 1864; these improvements being in double-folding the ruler-edge and soldering a narrow folded strip of sheet metal under and a little back of the ruler-edge in such manner as to form a gutter to catch any ink that may get onto the ruler-edge, to prevent it from getting on the paper; also, in soldering stays across the middle rib, and also in forming a groove along and near the cutter-edge, which is also stayed, and also in the manner of hanging the roller in the stays under the middle rib.

Similar letters of reference indicate corresponding parts in the several figures.

To enable others skilled in the art to make and use my invention, I will proceed to describe it.

The combined ruler and paper-cutter is formed as shown in my patent of March 22, 1864, and the improvements thereon are shown in the accompanying drawings. The ruler-edge is double-folded, as shown, and a narrow strip of sheet metal folded and soldered beneath and a little back from the ruler, so as to form a gutter, as shown at $b$, to catch any surplus ink that may get from the pen on the ruler, to prevent it from getting on the paper. This arrangement also gives great strength and stiffness to the ruler-edge, preventing it from being easily injured, and making it more durable. The cutter-edge has a rib raised near the edge, which may be filled with metal for a short distance at the ends and in the middle, as shown at $f$, or have small pieces of metal soldered across it, as shown at $g\ g$, which serve to strengthen the edge and prevent its being easily injured, especially when thin metal is used.

The large middle rib, that serves the important double purpose of receiving the roller, as described in the old patent before mentioned, and also as a convenient means of handling the ruler, is stayed across the under side, near the ends, by pieces $c\ c\ d\ d$, soldered in, as shown, which gives additional strength and stiffness to the ruler.

The roller E is hung by pivots in long bearings, made by soldering pieces of metal onto pieces $c\ c$, properly formed to receive the roller-pivots, as shown in Fig. 3. When made in this way they do not wear the pivots and are not liable to get out of order.

The stays $c$ and $d$ may be set a little apart, as shown at one end of Fig. 2, or stay $d$ may have a hole punched through it, as at $i$, whereby to hang up the ruler.

The ends of the large rib of the ruler are closed up by soldering in small pieces of sheet metal, which serve, also, to give still greater strength and stiffness to the ruler.

If long rulers are required, instead of using one long roller it may be made in two pieces having stay like $c$ and the proper bearing fixed across the center of the ruler, the two central pivots resting on the one stay.

It is obvious that the form, arrangement, and construction of the several parts combine great strength, convenience, lightness, cheapness, straight edges for ruling and tearing paper by and protection from blotting the paper.

What I claim is—

The improvements herein described and shown at the letters $a$, $b$, $c$, $d$, $f$, and $g$, when formed, constructed, and arranged substantially as set forth.

DAVID MUNSON.

Witnesses:
O. F. MAYHEW,
A. G. PORTER.